US012699375B2

(12) United States Patent
Murakawa et al.

(10) Patent No.: US 12,699,375 B2
(45) Date of Patent: Aug. 4, 2026

(54) NUMERICAL CONTROLLER

(71) Applicant: Fanuc Corporation, Minamitsuru-gun (JP)

(72) Inventors: Kazuhiko Murakawa, Minamitsuru-gun (JP); Takeshi Mochida, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 344 days.

(21) Appl. No.: 18/269,345

(22) PCT Filed: Jan. 17, 2022

(86) PCT No.: PCT/JP2022/001434
§ 371 (c)(1),
(2) Date: Jun. 23, 2023

(87) PCT Pub. No.: WO2022/158428
PCT Pub. Date: Jul. 28, 2022

(65) Prior Publication Data
US 2024/0231309 A1      Jul. 11, 2024

(30) Foreign Application Priority Data
Jan. 20, 2021      (JP) ................................. 2021-007425

(51) Int. Cl.
*G05B 19/4097*          (2006.01)
(52) U.S. Cl.
CPC .................... *G05B 19/4097* (2013.01); *G05B 2219/35012* (2013.01)
(58) Field of Classification Search
None
See application file for complete search history.

(56) References Cited

U.S. PATENT DOCUMENTS

2009/0157218 A1      6/2009 Otsuki et al.
2010/0094435 A1      4/2010 Sun et al.
(Continued)

FOREIGN PATENT DOCUMENTS

CN        101458507 A      6/2009
CN        102428419 A      4/2012
(Continued)

OTHER PUBLICATIONS

Office Action (Notice of Reasons of Refusal) issued Sep. 3, 2024, by the Japan Patent Office in corresponding Japanese Patent Application No. 2022-576676 and an English translation of the Office Action. (8 pages).

(Continued)

*Primary Examiner* — Sean Shechtman
(74) *Attorney, Agent, or Firm* — BUCHANAN INGERSOLL & ROONEY PC

(57) ABSTRACT

A numerical controller controls a relative speed between a tool and a workpiece on the basis of a machining program. In a case where a corner part exists between a current block and a next block of the machining program, the next block is prefetched, and an allowable speed at the corner part at an end point of the current block is calculated. At least one of pre-interpolation acceleration of an acceleration part, a pre-interpolation speed of a constant-speed part, and pre-interpolation acceleration of a deceleration part that are relative speeds between the tool and the workpiece is adjusted so that the relative speed between the tool and the workpiece is maintained at a preset allowable speed while the corner part is passed through.

4 Claims, 10 Drawing Sheets

(56) References Cited

U.S. PATENT DOCUMENTS

| | | |
|---|---|---|
| 2012/0016514 A1 | 1/2012 | Nakamura et al. |
| 2014/0236340 A1 | 8/2014 | Terada et al. |
| 2014/0350709 A1 | 11/2014 | Mochida |
| 2016/0103446 A1 | 4/2016 | Aizawa et al. |
| 2020/0401115 A1 | 12/2020 | Liang et al. |

FOREIGN PATENT DOCUMENTS

| | | |
|---|---|---|
| CN | 103890670 A | 6/2014 |
| CN | 104175175 A | 12/2014 |
| CN | 105511407 A | 4/2016 |
| CN | 105807721 A | 7/2016 |
| CN | 106168790 A | 11/2016 |
| CN | 109426151 A | 3/2019 |
| CN | 112114558 A | 12/2020 |
| JP | 0240701 A | 2/1990 |
| JP | 02137006 A | 5/1990 |
| JP | 02195409 A | 8/1990 |
| JP | 0619528 A | 1/1994 |
| JP | 06187028 A | 7/1994 |
| JP | H08-006627 A | 1/1996 |
| JP | 2007-279899 A | 10/2007 |
| JP | 2009251804 A | 10/2009 |
| JP | 2013-069123 A | 4/2013 |
| JP | 2016-133988 A | 7/2016 |
| WO | 2018/086215 A1 | 5/2018 |

OTHER PUBLICATIONS

International Search Report and Written Opinion for International Application No. PCT/JP2022/001434, dated Apr. 5, 2022, 5 pages.

Office Action (The Second Office Action) issued Dec. 5, 2025, by the State Intellectual Property Office of People's Republic of China in corresponding Chinese Patent Application No. 202280009772.4 and an English translation of the Office Action. (10 pages).

Office Action (The First Office Action) issued Aug. 25, 2025, by the State Intellectual Property Office of People's Republic of China in corresponding Chinese Patent Application No. 202280009772.4 and an English translation of the Office Action. (13 pages).

Notice of Allowance (Notification of Grant of Patent for Invention) issued Jan. 29, 2026, by the State Intellectual Property Office of People's Republic of China in corresponding Chinese Patent Application No. 202280009772.4 and an English machine translation of the Notice of Allowance. (6 pages).

PRE-INTERPOLATION ACCELERATION/DECELERATION IN CONVENTIONAL BLOCK OVERLAP PROCESSING

FIG. 7

PRE-INTERPOLATION ACCELERATION/DECELERATION IN CASE WHERE CORRECTION AMOUNT EXCEEDS THRESHOLD VALUE

PRE-INTERPOLATION ACCELERATION/DECELERATION IN THIRD DISCLOSURE

NUMERICAL CONTROLLER

CROSS REFERENCE TO RELATED APPLICATIONS

This is the U.S. National Phase application of PCT/JP2022/001434, filed Jan. 17, 2022, which claims priority to Japanese Patent Application No. 2021-007425, filed Jan. 20, 2021, the disclosures of each of these applications being incorporated herein by reference in their entireties for all purposes.

FIELD OF THE INVENTION

The present invention relates to a numerical controller that controls a machine tool.

BACKGROUND OF THE INVENTION

Conventionally, a method called block overlap has been used to shorten a machining time period of a machine tool. For example, Patent Literature 1 discloses that machining is performed without decelerating a speed to zero at a joint between blocks at the time of transition from a current block to a next block by starting a command of the next block before a deceleration speed becomes zero after the interpolation of the current block is completed.

PATENT LITERATURE

Patent Literature 1: JP H02-40701 A

SUMMARY OF THE INVENTION

In the block overlap processing, a tool is decelerated to a sufficient speed (referred to as an allowable speed) in a current block, and a next block is started. When the block overlap processing is used, a machining time period becomes shorter than that in a case where a speed is made zero at an end point of the current block and the next block is started, and impact applied to a workpiece and the tool can be reduced within an allowable range. The deceleration of a tool speed is performed in each interpolation cycle, but a time point when the tool speed is decelerated to the allowable speed does not necessarily coincide with a time point when the tool reaches the end point, and a remaining movement amount occurs. In the overlap processing, an overlap amount S is added to a remaining movement amount R, and the next block is started without generating a speed difference from the allowable speed. At this time, since the next block is started by the remaining movement amount R before the end point of the block, a corner that is a joint between the current block and the next block is not passed through and the inside of the corner is passed through. In the block overlap processing, the remaining movement amount R varies depending on a manner of combining the current block and the next block and is not constant even at corners having the same angle.

In the field of numerical controllers, there is a demand for a technique for shortening a machining time period while maintaining the machining quality of processing having a corner part.

A numerical controller of one aspect of the present disclosure is a numerical controller that controls a relative speed between a tool and a workpiece on the basis of a machining program, the numerical controller including: a machining program analyzing unit that performs: analyzing a first block and a second block that are included in the machining program, the first block being a movement command, the second block being a next movement command; in a case where a corner part exists between the first block and the second block, calculating an allowable speed at the corner part at the time of passing through the corner part; calculating a block command movement amount that is a distance between a start point and an end point of the first block; calculating a movement amount in each of an acceleration part where a pre-interpolation speed at the start point of the first block is accelerated to a command speed of the machining program, a constant-speed part where the command speed of the machining program is maintained, and a deceleration part where deceleration is performed from the command speed of the machining program to the allowable speed at the corner part adjacent to the second block on the basis of the pre-interpolation speed at the start point of the first block, the allowable speed at the corner part, and the block command movement amount of the first block; and obtaining a remaining movement amount of the first block from the movement amounts of the acceleration part, the constant-speed part, and the deceleration part, and the block command movement amount, in which at least one of pre-interpolation acceleration of the acceleration part, the command speed of the constant-speed part, and pre-interpolation acceleration of the deceleration part is corrected to adjust the movement amount of the acceleration part, the movement amount of the constant-speed part, and the movement amount of the deceleration part, and a sum of the movement amount of the acceleration part, the movement amount of the constant-speed part, and the movement amount of the deceleration part is brought close to the block command movement amount.

A computer-readable storage medium of an aspect of the present disclosure stores a computer-readable command that, when executed by one or more processors, causes the one or more processors to perform operations including: analyzing a first block and a second block that are included in a machining program, the second block being a next movement command; in a case where a corner part exists between the first block and the second block, calculating an allowable speed at the corner part at the time of passing through the corner part; calculating a block command movement amount that is a distance between a start point and an end point of the first block; calculating a movement amount in each of an acceleration part where a pre-interpolation speed at the start point of the first block is accelerated to a command speed of the machining program, a constant-speed part where the command speed of the machining program is maintained, and a deceleration part where deceleration is performed from the command speed of the machining program to the allowable speed at the corner part adjacent to the second block on the basis of the pre-interpolation speed at the start point of the first block, the allowable speed at the corner part, and the block command movement amount of the first block; obtaining a remaining movement amount of the first block from the movement amounts of the acceleration part, the constant-speed part, and the deceleration part and the block command movement amount; and correcting at least one of pre-interpolation acceleration of the acceleration part, the command speed of the constant-speed part, and pre-interpolation acceleration of the deceleration part to adjust the movement amount of the acceleration part, the movement amount of the constant-speed part, and the movement amount of the deceleration part and bring a sum of the movement amount of the acceleration part, the movement amount of the constant-speed part, and the movement amount of the deceleration part close to the block command movement amount.

According to the one aspect of the present invention, it is possible to shorten a machining time period while maintaining the machining quality of processing having a corner part.

BRIEF DESCRIPTION OF DRAWINGS

FIG. 3 is an example of a machining program.

FIG. 7 is a graph illustrating a change in a pre-correction speed in a case where a correction amount exceeds a threshold value in the first disclosure.

DETAILED DESCRIPTION OF EMBODIMENTS OF THE INVENTION

[First Disclosure]

Figure 1:
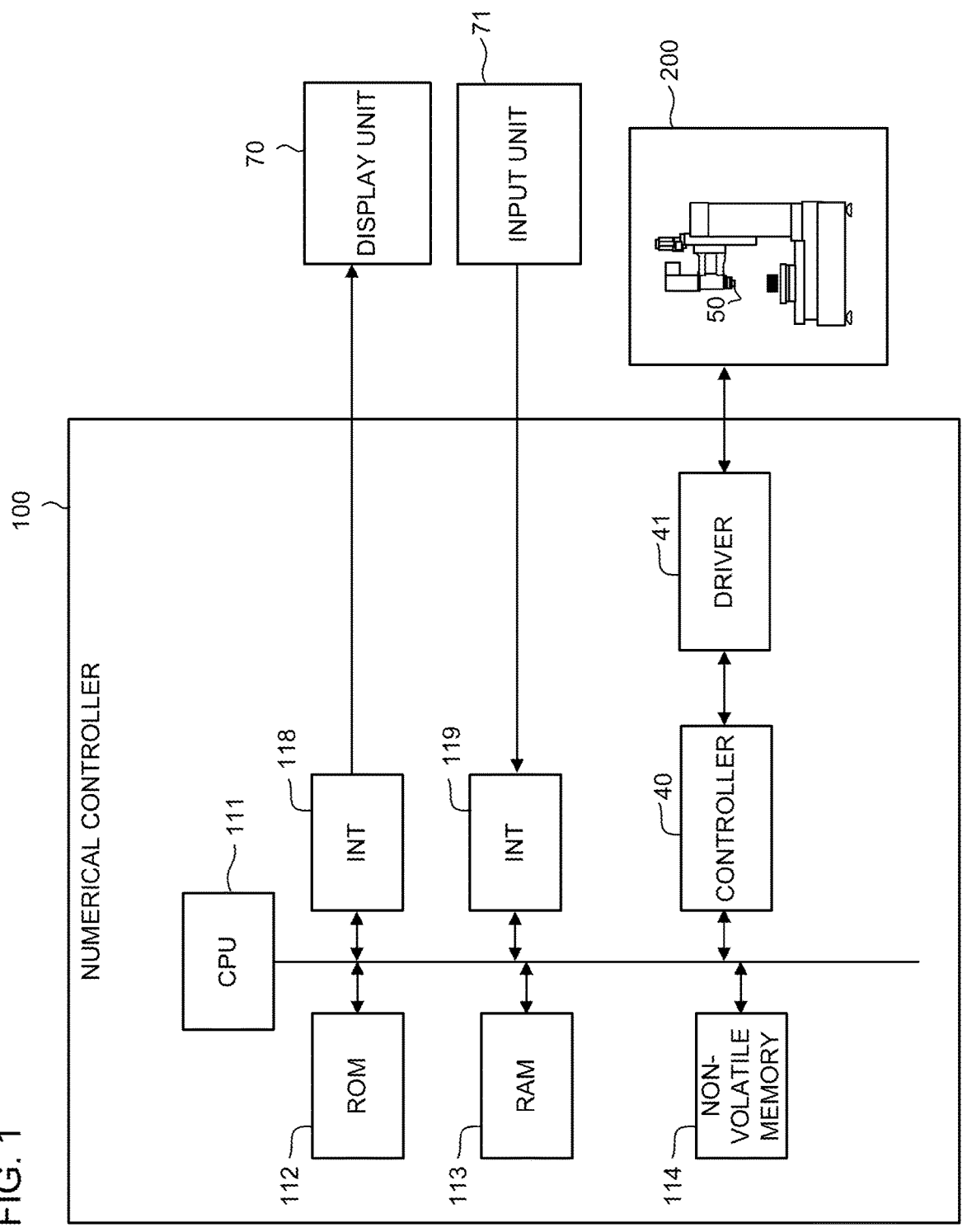
FIG. 1 is a hardware configuration diagram of a numerical controller.

FIG. 1 is a schematic diagram of a numerical controller 100.

The numerical controller 100 controls a relative speed between a tool and a workpiece that are attached to a machine tool according to a machining program. Note that in the present disclosure, in order to simplify description, it is assumed that the workpiece is fixed, and only a speed of the tool is considered.

The numerical controller 100 in FIG. 1 is connected to a machine tool 200. In FIG. 1, the numerical controller 100 and the machine tool 200 are separate, but may be integrated.

The workpiece is attached to a table of the machine tool 200. A tool 50 is attached to a main shaft of the machine tool 200. The tool 50 moves in three axial directions of an X-axis, a Y-axis, and a Z-axis. Here, an example of moving only to the X-axis and the Y-axis will be described, but the present disclosure may be applied to a multi-axis machine tool having three or more axes.

Hereinafter, the numerical controller 100 will be described. A central processing unit (CPU) 111 included in the numerical controller 100 in FIG. 1 is a processor configured to control the numerical controller 100 as a whole. The CPU 111 is configured to read a system program stored in a read-only memory (ROM) 112 via a bus 122, and control the whole of the numerical controller 100 according to the system program. A random access memory (RAM) 113 is configured to temporarily store temporary calculation data, display data, various data input by a user via an input unit 71, and the like.

A display unit 70 is a monitor or the like attached to the numerical controller 100, and displays a setup support screen, a setup procedure manual, and the like.

The input unit 71 is a keyboard, a touch panel, or the like integrated with the display unit 70 or separated from the display unit 70. The user operates the input unit 71 to perform operations such as inputting on a screen displayed on the display unit 70.

A non-volatile memory 114 is, for example, a memory that is backed up by a battery (not illustrated) or the like and maintains a storage state even when the numerical controller 100 is powered off. The non-volatile memory 114 stores a program read from an external device via an interface (not illustrated), a program input via the input unit 71, and various data acquired from each unit of the numerical controller 100, the machine tool 200, and the like (for example, setting parameters or the like acquired from the machine tool 200, and the like). The program and the various data stored in the non-volatile memory 114 may be expanded in the RAM 113 at the time of execution or use. In addition, various system programs are written in advance in the ROM 112.

A controller 40 that controls each axis of the machine tool 200 converts an axis movement command from the CPU 111 into a pulse signal and outputs the pulse signal to a driver 41. The driver 41 converts the pulse signal into a current to drive a servo motor.

The tool 50 is moved by the power of the servo motor. Alternatively, the tool 50 and the workpiece may be relatively moved by moving the table. In the present disclosure, in order to simplify description, an example in which the table is fixed and only the tool 50 is moved is illustrated.

Figure 2:
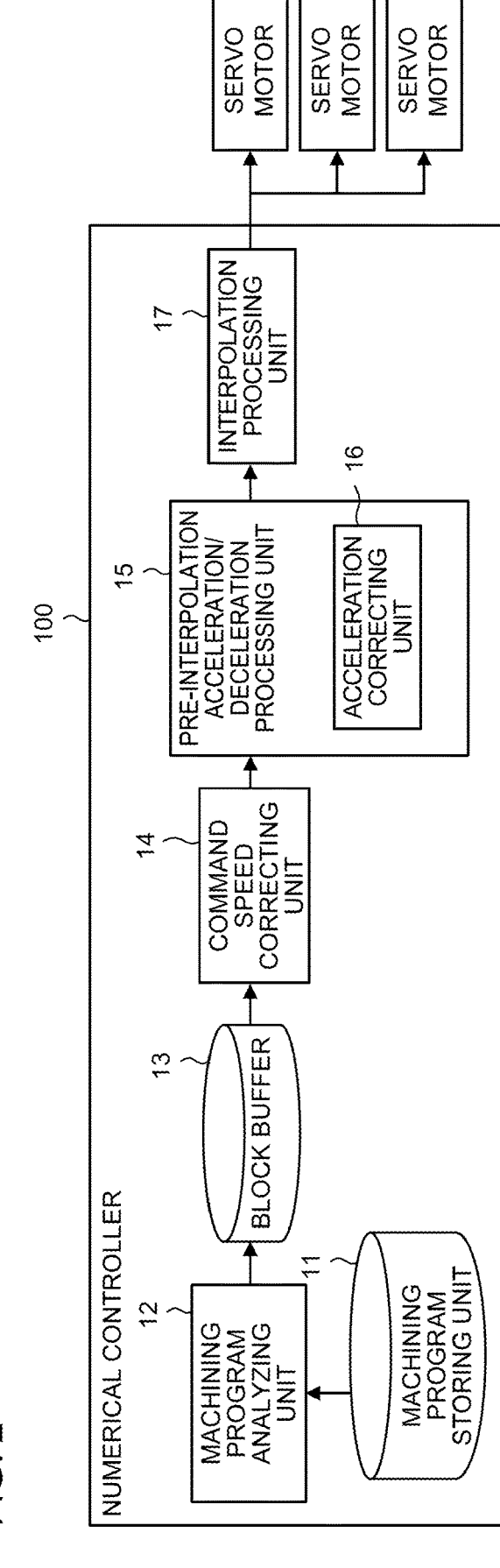
FIG. 2 is a block diagram of the numerical controller.

FIG. 2 is a block diagram of the numerical controller 100.

The numerical controller 100 includes a machining program storing unit 11, a machining program analyzing unit 12, a block buffer 13 that temporarily stores an analyzed machining program, a command speed correcting unit 14 that corrects a command speed F of a current block described in the machining program, a pre-interpolation acceleration/deceleration processing unit 15 that performs acceleration/deceleration processing of a pre-interpolation speed on the basis of pre-interpolation acceleration/deceleration A, an acceleration correcting unit 16 that corrects the pre-interpolation acceleration/deceleration A, and an interpolation processing unit 17 that converts a calculated pre-interpolation speed into a distribution pulse of the servo motor such as the X-axis, the Y-axis, and the Z-axis.

In the following disclosures, a method of adjusting the pre-interpolation speed in two dimensions will be described, but the present disclosure can also be applied to control in three or more dimensions.

The machining program storing unit 11 stores the machining program. FIG. 3 is an example of the machining program.

The numerical controller 100 processes the machining program line by line. The one line is referred to as a block. The block in the first line of the machining program in FIG. 3 is "G91G01 X20 F1000;" and a block in a next line is "Y50;".

The machining program includes a movement command and a basic operation command. The movement command includes "G00: fast-forward (positioning)", "G01: linear interpolation (cutting feed)", "G02-G03: circular interpolation", and the like. In the movement command, a movement destination and a movement speed are described. The block in FIG. 3 is a movement command that is a command to move the tool 50 by "20" in a Y direction after moving by "50" in an X direction at a moving speed of "F1000".

The machining program analyzing unit 12 calculates a movement direction and a pre-interpolation speed of the tool

50 on the basis of the machining program. A corner part movement allowable speed D is a speed of a tool that can move a corner part while maintaining machining quality and avoiding impact on a machine, and is determined by the speed of the tool 50, a material of the workpiece, an angle of the corner part, and the like. Since a method for determining a corner part movement allowable speed is an existing technique, the description thereof will be omitted.

The pre-interpolation speed is a speed of the tool 50 before distribution in an X-axis direction, a Y-axis direction, and a Z-axis direction by the interpolation processing unit 17, and is a combined speed of speeds distributed in the X-axis direction, the Y-axis direction, and the Z-axis direction.

Figure 4:
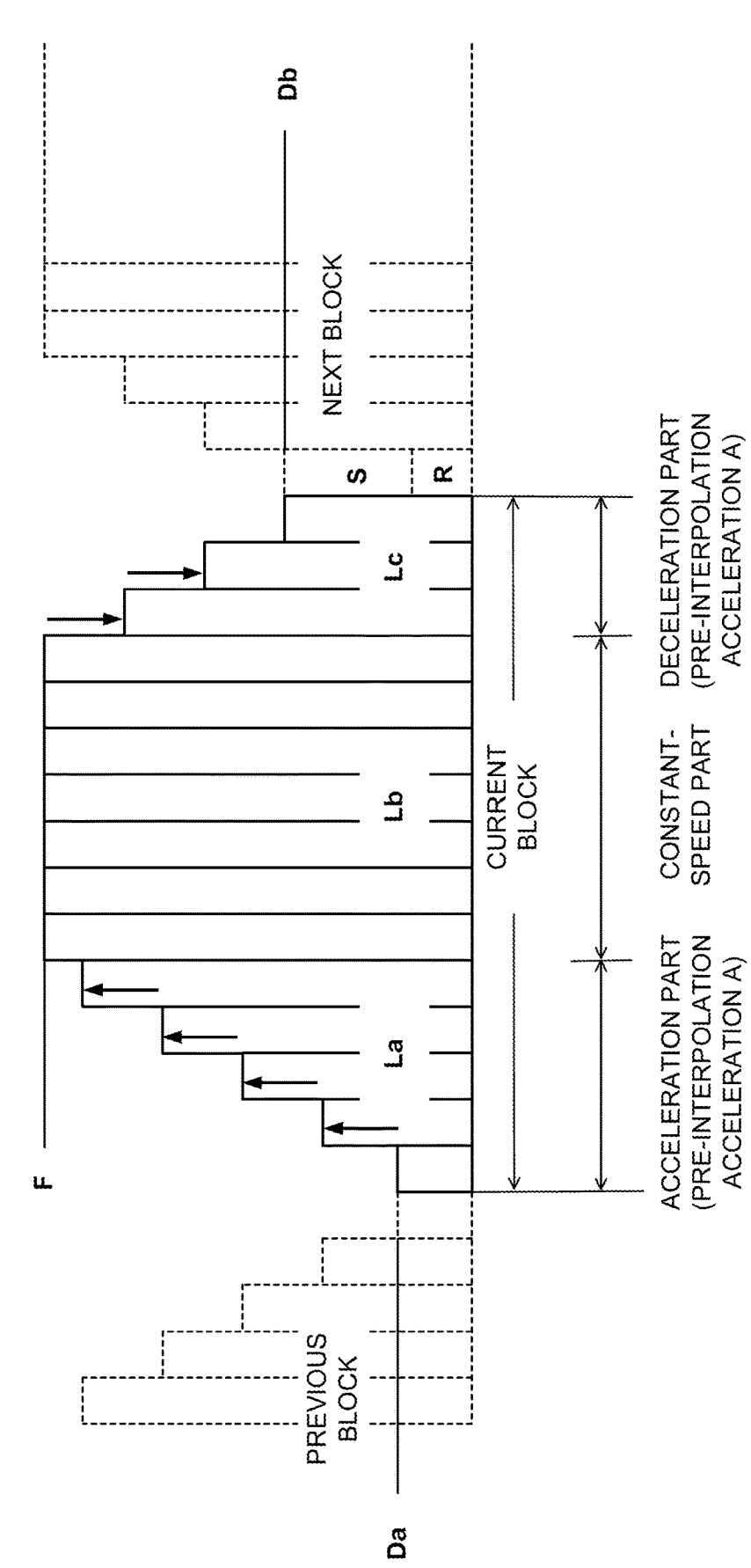
FIG. 4 is a graph illustrating a change in a pre-interpolation speed in conventional block overlap processing.

Referring to FIG. 4, a conventional pre-interpolation speed calculation method will be described.

The machining program analyzing unit 12 prefetches a block of the machining program, and calculates the corner part movement allowable speed D in a case where a corner part is present at a joint between a block to be analyzed (referred to as current block) and a next block (referred to as next block).

Next, the machining program analyzing unit 12 calculates pre-interpolation speeds of the acceleration part, the constant-speed part, and the deceleration part.

An allowable speed at the corner part Da adjacent to the previous block has already been calculated at the time of analysis of a previous block. In the acceleration part, acceleration is performed from the allowable speed at the corner part Da to the command speed F. Pre-interpolation acceleration A is a value in consideration of machining quality and safety, and is set to an appropriate value in advance. In the present disclosure, also at the time of deceleration, deceleration is performed at a pre-interpolation acceleration equal in absolute value to the pre-interpolation acceleration A.

The number of times of interpolation processing in the acceleration part when the allowable speed at the corner part Da is accelerated to the command speed F is m. The number of times of interpolation processing m in the acceleration part is an integer part of $(F-Da)/A$ that is a value obtained by dividing a difference between the command speed F and the allowable speed at the corner part Da by the pre-interpolation acceleration/deceleration A. In an example of FIG. 4, the number of times of interpolation processing m in the acceleration part is five.

The pre-interpolation speeds of the tool 50 in the acceleration part are added to obtain a movement amount La of the tool 50 in the acceleration part. The movement amount La of the tool 50 in the acceleration part can be expressed as the following Formula 1.

$$La = Da + (Da + A \times 1) + (Da + A \times 2) + \dots + (Da + A \times m) \quad \text{[Formula 1]}$$
$$= Da + Da \times m + A \times (1 + 2 + 3 + \dots + m)$$

(Here, m is an integer part of $(F-Da)/A$)

In the deceleration part, the command speed F is decelerated to an allowable speed at the corner part Db. The number of times of interpolation processing in the deceleration part is n. The number of times of interpolation processing n in the deceleration part is an integer part of $(F-Db)/A$ that is a value obtained by dividing a difference between the command speed F and the allowable speed at the corner part Db by the pre-interpolation acceleration/deceleration A. In the example of FIG. 4, the number of times of output of a pulse n in the deceleration part is three.

The pre-interpolation speeds of the tool 50 in the deceleration part are added to obtain a movement amount Lc of the tool 50 in the deceleration part. The movement amount Lc of the tool 50 in the deceleration part can be expressed as the following Formula 2.

$$Lc = \{F - (A \times 1)\} + \{F - (A \times 2)\} + \dots + \{F - (A \times n)\} + Db \quad \text{[Formula 2]}$$
$$= F \times n - A \times (1 + 2 + 3 + \dots + n) + Db$$

(Here, n is an integer part of $(F-Db)/A$)

An ideal value of a movement amount Lb of the constant-speed part is obtained by subtracting the movement amount La of the acceleration part and the movement amount Lc of the deceleration part from a block command movement amount L. The block command movement amount L can be calculated from the coordinates of a start point and an end point of the tool 50 described in the machining program. When the ideal value of the movement amount Lb is divided by the command speed F, the number of times of interpolation processing t in the constant-speed part is obtained. In the example of FIG. 4, the number of times of interpolation processing t in the constant-speed part is seven.

The following Formula 3 shows a relationship among the number of times of interpolation processing t in the constant-speed part, the command speed F, and a movement distance Lb of the constant-speed part.

$$Lb = F \times t \quad \text{[Formula 3]}$$

(Here, t is an integer part of $(L-La-Lb)/F$)

Here, when $L=(La+Lb+Lc)$ holds, block overlap processing is unnecessary. However, actually, a remaining movement amount R occurs. The following Formula 4 is a formula indicating a relationship between the movement amount La of the acceleration part, the movement amount Lb of the constant-speed part, the movement amount Lc of the deceleration part, and the remaining movement amount R, and a modification of Formula 4.

A movement amount obtained by summing the movement amount La of the acceleration part, the movement amount Lb of the constant-speed part, and the movement amount Lc of the deceleration part is shorter by the remaining movement amount R than the block command movement amount L described in the machining program.

$$R = L - (La + Lb + Lc) \quad \text{[Formula 4]}$$
$$L = La + Lb + Lc + R$$

In conventional block overlap processing, a command of a next block is started while a remaining movement amount R of a current block is left. At this time, the remaining movement amount R and a block overlap amount S are added in a first interpolation cycle of the next block so that the pre-interpolation speed becomes the allowable speed at the corner part Db.

Figure 5:
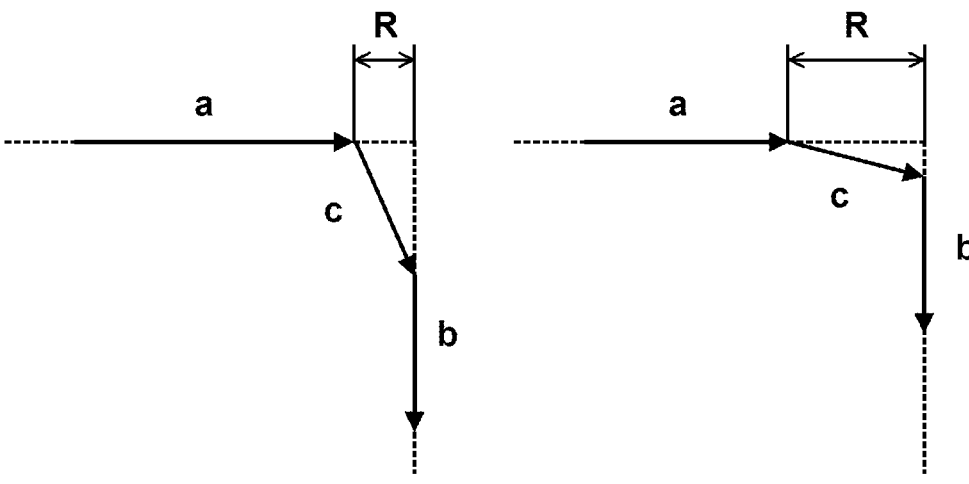
FIG. 5 are diagrams illustrating movement paths of a tool in the conventional block overlap processing.

FIG. 5 illustrates examples of a movement path of the tool in the conventional block overlap processing.

In a case where the current block moves in a direction of an arrow a and the next block moves in a direction of an arrow b, a corner part is generated between the current block and the next block.

In the conventional block overlap processing, since a remaining movement amount R is generated, the remaining movement amount R is output by a first command of the next block. Since a moving direction of the remaining movement amount R is the direction of the arrow a and a moving direction of a block overlap amount is the direction of the arrow b, in a first interpolation cycle of the next block, a direction of an arrow c obtained by adding the two vectors is obtained. The first command of the next block causes a movement in the direction of arrow c at the allowable speed at the corner part Db. In the block overlap processing, a command pulse is generated inside the corner part without passing through the corner part.

In the examples of FIG. 5, a remaining movement amount R in the left diagram and a remaining movement amount R in the right diagram are different in magnitude. Since the remaining movement amount R changes according to conditions such as the pre-interpolation acceleration A, the allowable speed at the corner part Da of the previous block, and the command speed F, variations occur even at corner parts having the same angle. A path instructed by the numerical controller 100 changes even at the corner parts having the same angle.

[Description of Present Disclosure]

In the present disclosure, the remaining movement amount R is made zero by correcting pre-interpolation acceleration of the acceleration part, a pre-interpolation speed of the constant-speed part, and pre-interpolation acceleration of the deceleration part calculated in the conventional block overlap processing. As a result, the numerical controller outputs a command to cause the tool to pass through the corner part while maintaining the allowable speed at the corner part Db.

[First Disclosure]

The command speed correcting unit 14 corrects the pre-interpolation speed of the constant-speed part. A correction amount r is a quotient obtained by dividing the remaining movement amount R by the number of times of interpolation processing t in the constant-speed part. The following Formula 5 is a formula for calculating the correction amount r and a post-correction command speed F'.

$$r = \frac{R}{t} \qquad \text{[Formula 5]}$$

$$F' = F + r$$

By correcting the command speed F of the constant-speed part to the command speed F', a post-correction movement amount Lb' of the constant-speed part becomes Lb'=La+R. As a result, a movement amount of the constant-speed part becomes long by the same distance as the remaining movement amount R, and thus the remaining movement amount R becomes zero.

Figure 6:
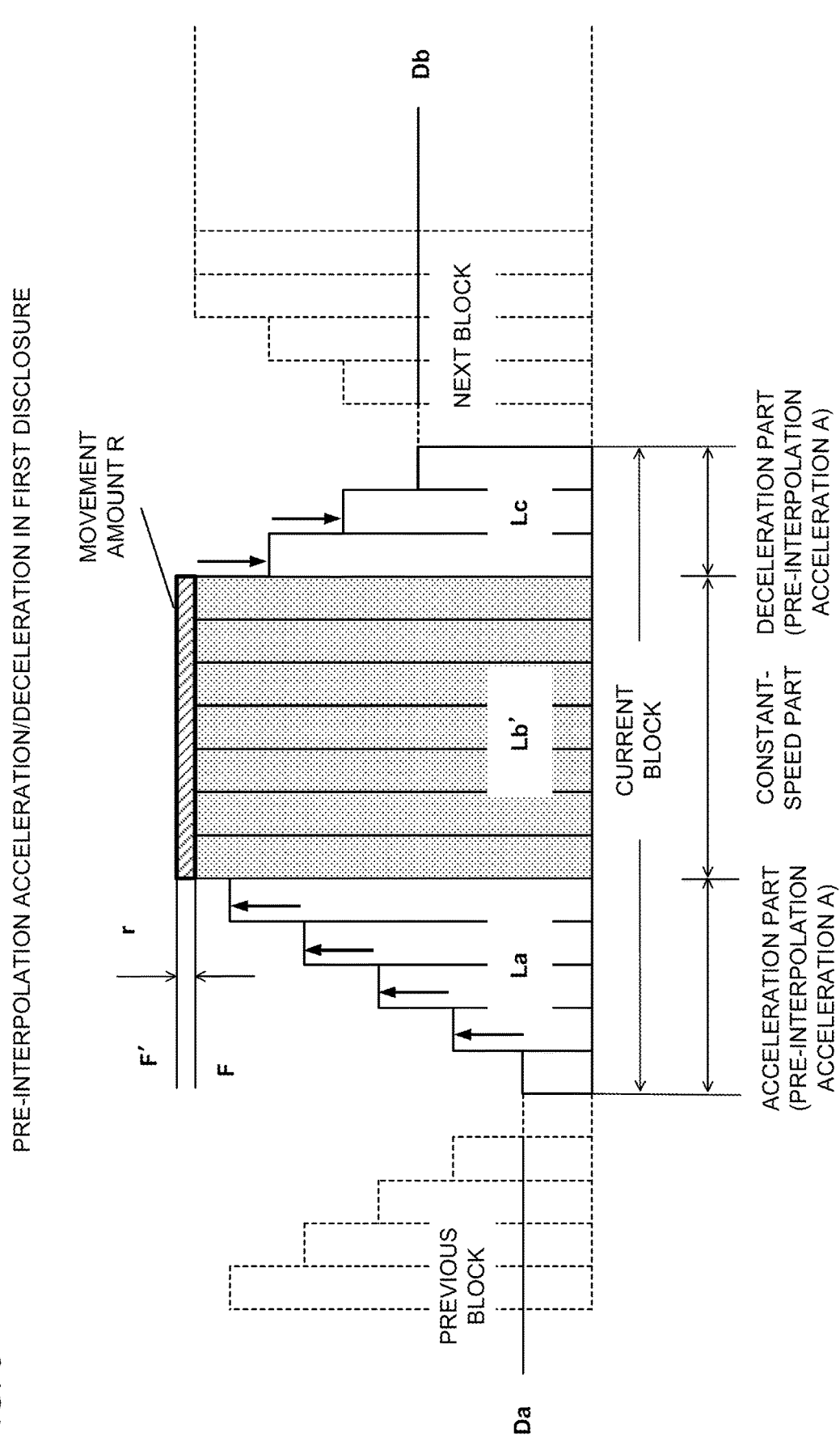
FIG. 6 is a graph illustrating a change in a pre-interpolation speed in a first disclosure.

When the pre-interpolation speed of the constant-speed part is corrected to the post-correction command speed F', as illustrated in FIG. 6, the post-correction movement amount Lb' is obtained by adding the remaining movement amount R to the pre-correction movement amount Lb of the constant-speed part. Therefore, the block command movement amount L, the movement amount La of the acceleration part, the movement amount Lb' of the constant-speed part, the movement amount Lc of the deceleration part satisfy the following Formula 6, and the remaining movement amount R becomes zero.

$$Lb' = Lb + R \qquad \text{[Formula 6]}$$

$$L = La + Lb' + Lc$$

A threshold value is set for the correction amount r. The threshold value is provided to guarantee machining quality and safety. When the correction amount r of the post-correction command speed F' (referred to as the first post-correction command speed F') described above exceeds the threshold value, a machining surface may become rough or the tool may be damaged. In a case where the correction amount r exceeds the threshold value, the machining program analyzing unit 12 increases the number of times of interpolation processing t in the constant-speed part by one. At this time, the pre-interpolation speed of the constant-speed part is calculated by dividing the movement amount Lb' of the constant-speed part by the number of times of output of a pulse (t+1) so that the movement amount of the constant-speed part becomes Lb'. A speed calculated in this manner is referred to as the second post-correction command speed F". Since the second post-correction command speed F" is lower than the command speed F of the present program, there is no risk of deterioration in machining quality or tool breakage. The following Formula 7 is a formula for calculating the second post-correction command speed F".

$$Lb' = Lb + R \qquad \text{[Formula 7]}$$

$$F'' = Lb' / (t + 1)$$

Figure 7:
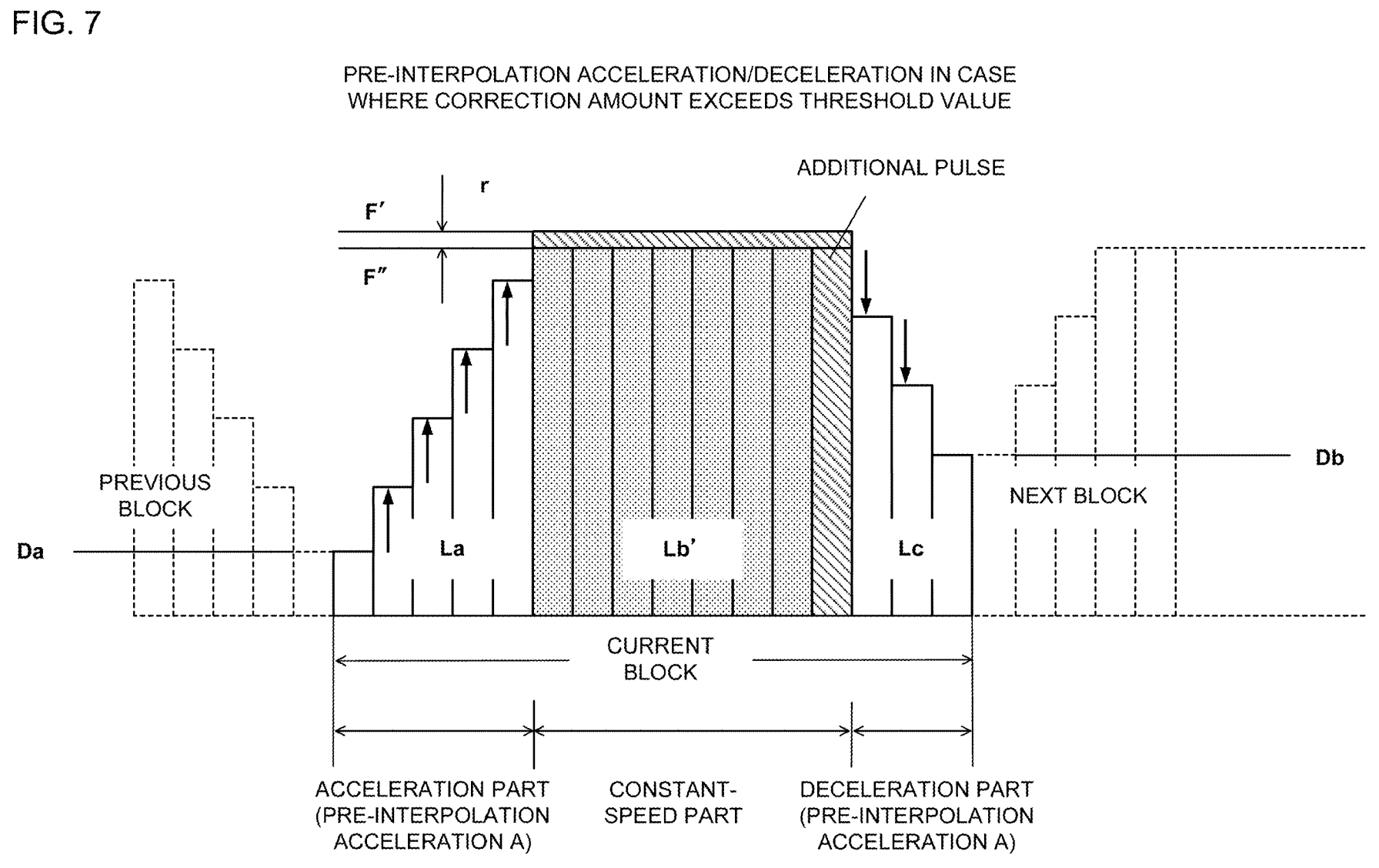

FIG. 7 illustrates a change in the pre-interpolation speed when corrected with the second post-correction command speed F".

The number of times of output in the constant-speed part is increased from seven to eight. The second post-correction command speed F" is slower than the command speed F, but since the number of times of output in the constant-speed part is increased by one, the movement amount of the constant-speed part is Lb'. Therefore, Formula 6 is satisfied, and the remaining movement amount R becomes zero.

[Second Disclosure]

Figure 8:
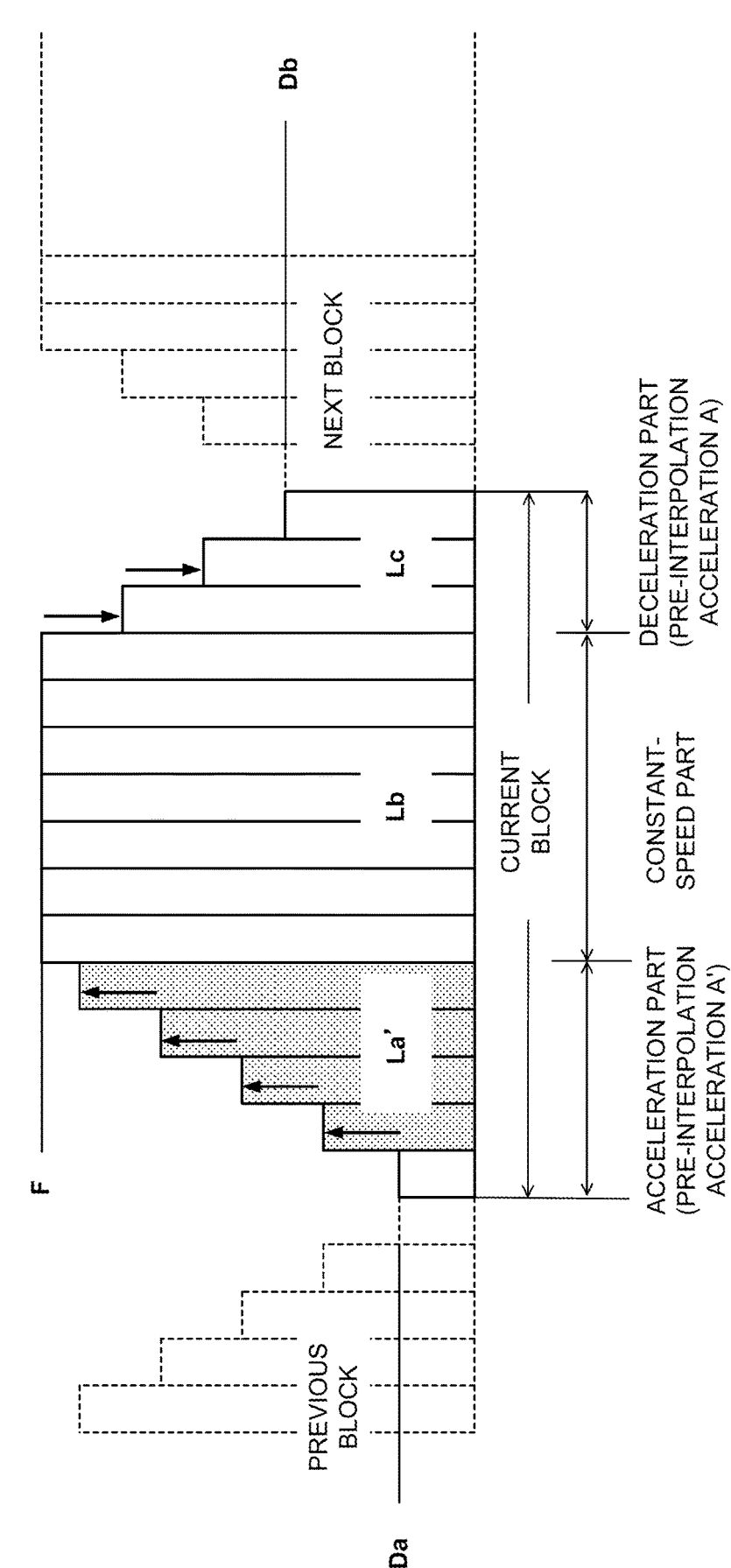
FIG. 8 is a graph illustrating a change in a pre-interpolation speed in a second disclosure.

In a second disclosure, an acceleration correcting unit 16 corrects pre-interpolation acceleration A to pre-interpolation acceleration A'. Referring to FIG. 8, a formula for calculating the pre-interpolation acceleration A' will be described.

In order to correct the pre-interpolation acceleration A to make a remaining movement amount R zero, it is necessary to correct a movement amount of an acceleration part to La' (=La+R). In a case where a threshold value of a correction amount is set to +B, the range of pre-interpolation acceleration/deceleration A' after correction is A−B≤A'≤A+B. The following Formula 8 is a formula for obtaining a movement amount La' of the acceleration part when acceleration is performed at the pre-interpolation acceleration/deceleration A'. The post-correction movement amount La' and an allowable speed at a corner part Da are both known, and the range of the pre-interpolation acceleration/deceleration A' is also known. Therefore, a lower limit value (A−B) of A' and an upper limit value (A+B) of A' are input to Formula 8, and a lower limit value mb of m and an upper limit value ma of m are obtained. In a case where the number of time of output m in the acceleration part obtained by Formula 1 satisfies the condition of ma≤m≤mb, the number of time of output of a pulse m calculated by Formula 1 is adopted. By substituting this m into Formula 8, the pre-interpolation acceleration/deceleration A' after correction is obtained.

Note that in a case where m does not satisfy the condition of ma≤m≤mb, mb or ma, whichever is closer to the value of m is substituted into Formula 8 to obtain the pre-interpolation acceleration A' after correction. In this manner, the pre-interpolation acceleration A' after correction at which the remaining movement amount becomes zero is determined.

$$La' = Da + Da \times m + A' \times (1 + 2 + 3 + ... + m) \qquad \text{[Formula 8]}$$

[Third Disclosure]

Figure 9:
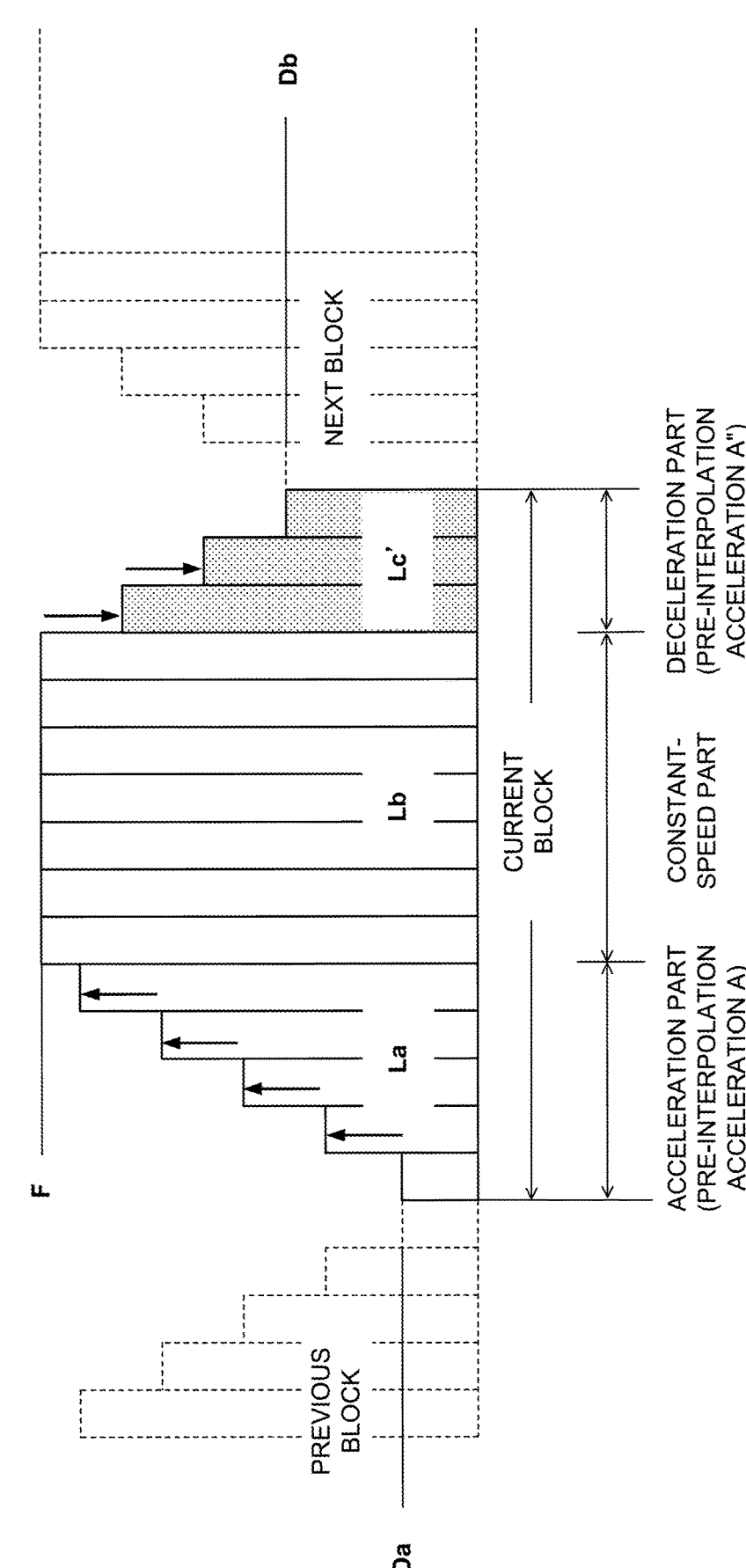
FIG. 9 is a graph illustrating a change in a pre-interpolation speed in a third disclosure.

In a third disclosure, an acceleration correcting unit 16 corrects pre-interpolation acceleration A of a deceleration part to pre-interpolation acceleration A". Referring to FIG. 9, a formula for calculating the pre-interpolation acceleration A" will be described.

In order to correct the pre-interpolation acceleration A in the deceleration part to make a remaining movement amount R zero, it is necessary to correct a movement amount of the deceleration part to Lc' (=Lc+R). In a case where a threshold value of a correction amount is set to +B, the range of pre-interpolation acceleration/deceleration A" after correction is A−B≤A"≤A+B. The following Formula 9 is a formula for obtaining a movement amount Lc' of the deceleration part when deceleration is performed at the pre-interpolation acceleration/deceleration A". The post-correction movement amount Lc' and an allowable speed at the corner part Db are both known, and the range of the pre-interpolation acceleration/deceleration A" is also known. Therefore, a lower limit value (A−B) of A" and an upper limit value (A+B) of A" are input to Formula 9, and a lower limit value na of n and an upper limit value nb of n are obtained. In a case where the number of time of output in the deceleration part n obtained by Formula 2 satisfies the condition of na≤n≤nb, the number of time of output n calculated by Formula 2 is adopted. By substituting this n into Formula 9, the pre-interpolation acceleration/deceleration A" after correction can be obtained.

Note that in a case where n does not satisfy the condition of na≤n≤mb, nb or na, whichever is closer to the value of n, is substituted into Formula 9 to be able to obtain the pre-interpolation acceleration A" after correction. In this manner, the pre-interpolation acceleration A" after correction at which the remaining movement amount becomes zero is determined.

$$Lc' = F \times n - A'' \times (1 + 2 + 3 + ... + n) + Db \qquad \text{[Formula 9]}$$

The interpolation processing unit 17 performs interpolation processing on the pre-interpolation speed corrected by the methods of the first disclosure, the second disclosure, and the third disclosure described above, and outputs a distribution pulse amount of an X-axis speed, a Y-axis speed, and a Z-axis speed is output to a corresponding servo motor. The servo motor rotates the servo motor according to the distributed pulse amount output from an interpolation unit to move the tool 50. Note that although only the movement of the tool 50 is controlled in the present disclosure, the table on which the workpiece is placed may actually move, and this case is also included in the present disclosure as being a relative movement between the tool and the workpiece.

Actual Calculation Example

A calculation using actual numerical values will be described. The values of variables used in this calculation example are as follows.

Interpolation cycle: 1.0 [msec]

Command speed: 30000.0 [mm/min]

(Command speed F in one interpolation cycle=30000.0/60000=0.5 [mm/msec])

Block command movement amount (L): 50.0 [mm]

Acceleration of pre-interpolation acceleration/deceleration: 40.0 [mm/sec$^2$]

(Acceleration (A) in one interpolation cycle: 40.0/1000=0.04 [mm/msec$^2$])

Allowable speed at the corner part adjacent to the previous block: 6000.0 [mm/min]

(Allowable speed at the corner part Da in one interpolation cycle=6000.0/60000=0.1 [mm/msec])

Allowable speed at the corner adjacent to the next block: 9000.0 [mm/min]

(Allowable speed at the corner part Db in one interpolation cycle=9000.0/60000=0.15 [mm/msec])

[Calculation Common to First Disclosure, Second Disclosure, and Third Disclosure]

[Calculation of Pre-Interpolation Speed, Movement Amount, Remaining Movement Amount, and Number of Times of Output of Pulse]

First, the pre-interpolation speeds, the number of times of interpolation processing m, t, and n, the movement amounts La, Lb, and Lc of the acceleration part, the constant-speed part, and the deceleration part, and the remaining movement amount R are calculated.

By substituting the above values into Formula 1, the number of times of interpolation processing m in the acceleration part and the movement amount La of the acceleration part can be calculated.

m is an integer part of (0.5−0.1)/0.04=10.0, that is, m=10.

$$La = 0.1 + 0.1 \times 10 + 0.04 \times (1 + 2 + 3 + ... + 10) = 3.3$$

[mm]

By substituting the above values into Formula 2, the number of times of interpolation processing n in the deceleration part and the movement amount Lc of the deceleration part can be calculated.

m is an integer part of (0.5−0.15)/0.04=8.75, that is, n=8.

$$Lc = 0.5 \times 8 - 0.04 \times (1 + 2 + 3 + ... + 8) + 0.15 = 2.71 \text{ [mm]}$$

From Formula 3, the number of times of interpolation processing t in the constant-speed part and the movement amount Lb of the constant-speed part can be calculated.

t is an integer part of (50.0−3.3−2.71)/0.5=87.98, that is, t=87.

$$Lb = 0.5 \times 87 = 43.5 \text{ [mm]}$$

When the movement amount La of the acceleration part, the movement amount Lb of the constant-speed part, and the movement amount Lc of the deceleration part are calculated as described above, the remaining movement amount R can be calculated from Formula 4.

$$R = 50 - (3.3 + 43.5 + 2.71) = 0.49 \text{ [mm]}$$

5

[Calculation of First Disclosure]

In the first disclosure, the pre-interpolation speed of the constant-speed part is corrected. The correction amount r is a quotient obtained by dividing the remaining movement amount R by the number of times of output of a pulse t in the constant-speed part. The post-correction command speed F' can be calculated by adding the correction amount r to a pre-interpolation speed F of the constant-speed part. From Formula 5, the correction amount r and the post-correction command speed F' can be calculated.

$$r = 0.49/87 = 0.005632183...$$

$$F' = 0.5 + 0.005632183 = 0.505632183 \text{ [mm/}msec]$$

When F' is converted into speed per minute like the following formula, an actual command speed in the machining program is obtained.

$$F' \times 60000 = 20227.93103 \text{ [mm/min]}$$

However, the correction amount r has a threshold value. In a case where the threshold value of the correction amount r is set to +100.0 [min/msec], the correction amount r is 0.005632 [mm/msec]×60000≈336 [min/msec], which exceeds the threshold value. In this case, the interpolation processing of the constant-speed part is added once. Formula 7 is a formula for calculating the post-correction command speed F" when the interpolation processing is added once.

$$Lb' = 43.5 + 0.49 = 44.39$$

$$F'' = 44.39/(87 + 1) = 0.499886363 \text{ [mm/}msec^2]$$

In the first disclosure, by increasing the command speed of the constant-speed part by the correction amount r, the movement amount Lb of the constant-speed part increases by the same distance as the remaining movement amount R, so that the remaining movement amount R becomes zero. In a case where the correction amount r exceeds the threshold value, the interpolation processing is added once to calculate a new correction amount r.

[Calculation of Second Disclosure]

In the second disclosure, the movement amount La of the acceleration part is corrected to make the remaining movement amount R zero. A threshold value of a correction amount of acceleration is set to +10.0 [mm/sec²]. When this threshold value is converted into a unit of an interpolation cycle, the following result is obtained.

$$\pm 10.0/1000 = \pm 0.01 \text{ [mm/}m\,sec^2]$$

An upper limit and a lower limit value of the post-correction acceleration A' are determined as follows from the above threshold value.

$$A = 0.01 \le A' \le A + 0.01$$

When A=0.04 [mm/msec²] is substituted into the above inequality, the range of A' is 0.03≤A'≤0.05.

Substituting the allowable speed at the corner part Da adjacent to the previous block, and the post-correction movement amount La' (=La+R) into Formula 8 results in the following.

$$La' = 3.3 + 0.49 = 0.1 + 0.1 \times m + A' \times (1 + 2 + 3 + ... + m)$$

When a lower limit value 0.03 is substituted for A' in the above formula, m=13 is obtained. Meanwhile, when an upper limit value 0.05 is substituted for A', m=8 is obtained. Accordingly, 8≤m≤10 holds, and the number of times of interpolation processing in the acceleration part, that is, m=10 satisfies a condition described on the left. Therefore, substituting m=10 into Formula 8 results in the following.

$$La' = 3.3 + 0.49 = 0.1 + 0.1 \times 10 + A' \times (1 + 2 + 3 + ... + 10)$$

A'=0.04890909 [mm/msec²] is obtained from the above formula, and when this value is converted into speed per second, post-correction acceleration is 48.90909091 [mm/sec²]. When m does not satisfy the condition in this calculation, a value closest to the number of time of output of a pulse m in the acceleration part is selected from an upper limit value of m and a lower limit value of m, and the acceleration A' is calculated.

[Calculation of Third Disclosure]

In the third disclosure, the movement amount Lc of the deceleration part is corrected to make the remaining movement amount R zero. A threshold value of a correction amount of acceleration is set to ±10.0 [mm/sec²]. When this threshold value is converted into a unit of an interpolation cycle, the following result is obtained.

$$\pm 10.0/1000 = \pm 0.01 \text{ [mm/}msec^2]$$

An upper limit and a lower limit of the post-correction acceleration A" are determined as follows.

$$A - 0.01 \le A'' \le A + 0.01$$

When A=0.04 [mm/msec²] is substituted into the above inequality, the range of A" is 0.03≤A"≤0.05.

Substituting the allowable speed at the corner part Db adjacent to the next block and the post-correction movement amount Lc' (=Lc+R) into Formula 9 results in the following.

$$Lc' = 2.71 + 0.49 = 0.5 \times n - A'' \times (1 + 2 + 3 + ... + n) + 0.15$$

When an upper limit value 0.05 is substituted for A" in the above formula, n=9 is obtained. Meanwhile, a lower limit value 0.03 is substituted for A", n=13 is obtained. As a result, 9≤n≤13 holds, and n=9 close to the number of times of interpolation processing of the deceleration part=8 is used. Therefore, substituting n=9 into Formula 9 results in the following.

$$Lc' = 2.71 + 0.49 = 0.5 \times 9 - A'' \times (1 + 2 + 3 + \ldots + 9) + 0.15$$

A"=0.032222222"mm/msec$^2$" is obtained from the above formula, and when this value is converted into speed per second, post-correction acceleration is 32.222222" mm/sec$^2$".

As described above, in a case where a corner part exists between the current block and the next block, the numerical controller 100 calculates the allowable speed at the corner part Db from the machining programs of the current block and the next block and a speed at a start point of the current block (the allowable speed at the corner part Da in the present disclosure).

The numerical controller 100 calculates the number of times of output of a pulse in the acceleration part, the number of times of output of a pulse in the constant-speed part, and the number of times of output of a pulse in the deceleration part as that the allowable speed at the corner part Db is achieved at the end point of the current block. Then, the movement amount La of the acceleration part, the movement amount Lb of the constant-speed part, and the movement amount Lc of the deceleration part are obtained, and the remaining movement amount R is obtained.

The numerical controller 100 of the present disclosure corrects the pre-interpolation acceleration A of the acceleration part or the deceleration part and the command speed F of the constant-speed part to make the remaining movement amount R zero. The command speed F of the constant-speed part is corrected in the first disclosure described above, the pre-interpolation acceleration A of the acceleration part is corrected in the second disclosure, and the pre-interpolation acceleration A of the deceleration part is corrected in the third disclosure. However, not only one correction method but also a combination of these correction methods may be used.

Figure 10:
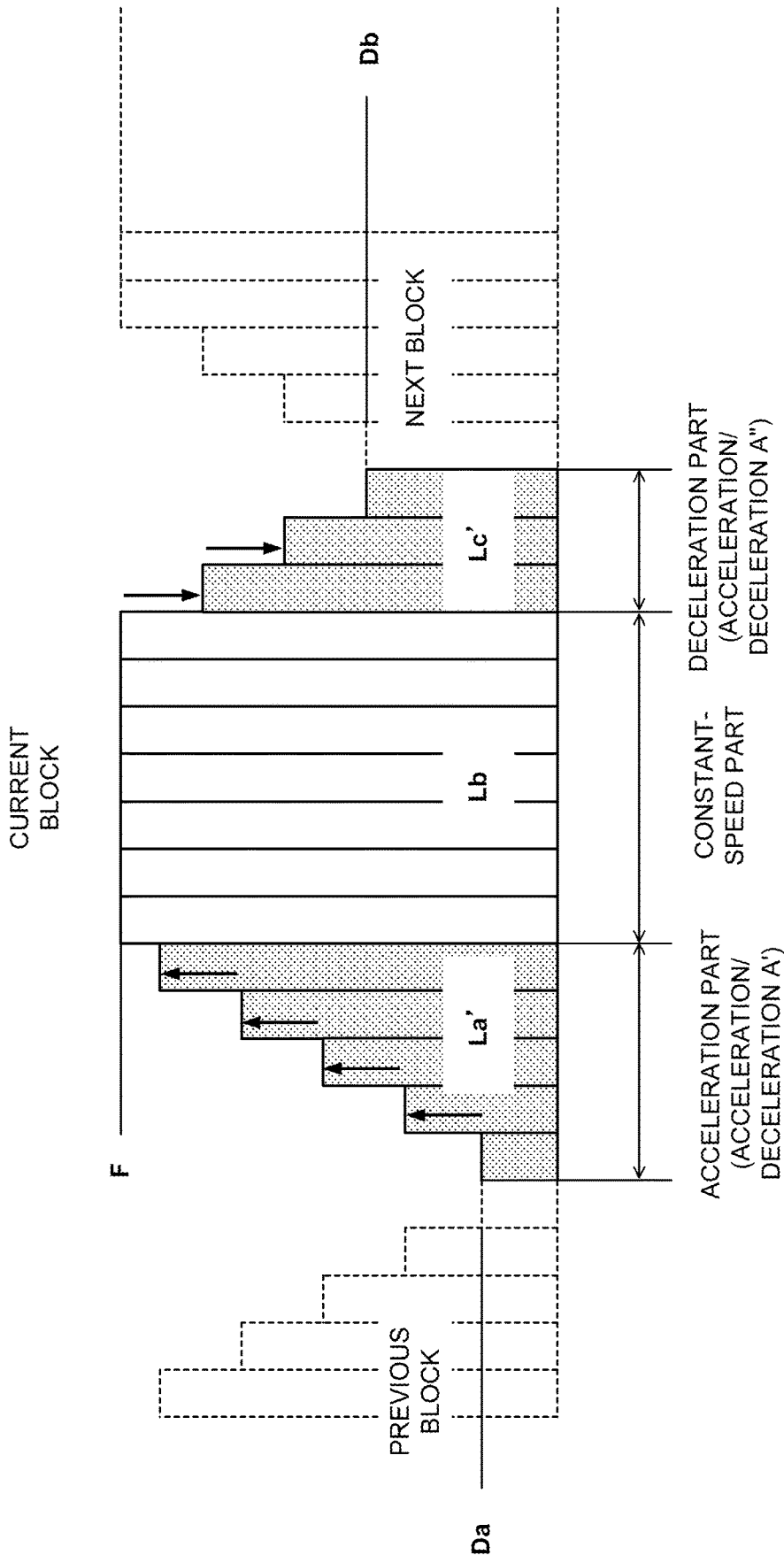
FIG. 10 is a graph illustrating a change in a pre-interpolation speed in a case where the second disclosure and the third disclosure are combined.

In addition, the pre-interpolation acceleration of the acceleration part is corrected in the first disclosure, the pre-interpolation speed of the constant-speed part is corrected in the second disclosure, and the pre-interpolation acceleration of the deceleration part is corrected in the third disclosure. However, as illustrated in FIG. 10, the second disclosure and the third disclosure may be combined, and the pre-interpolation acceleration of the acceleration part may be corrected to A' and the pre-interpolation acceleration of the deceleration part may be corrected to A". As a result of the corrections, a post-correction movement amount La' of the acceleration part and a post-correction movement amount Lc' of the deceleration part satisfy La'+Lc'=La+Lc+R. As a result, the condition of L=La'+Lb+Lc' is satisfied, and the remaining movement amount R becomes zero.

Note that although the examples in which the remaining movement amount R is made zero has been disclosed so far, the present disclosure also includes adjusting the remaining movement amount R to a value other than zero. The sum of the movement amount La of the acceleration part, the movement amount Lb of the constant-speed part, and the movement amount Lc of the deceleration part may be brought close to the block command movement amount L so that the remaining movement amount R is minimized as much as possible.

In the present disclosure, as illustrated in FIG. 2, the machining program analyzed by the machining program analyzing unit 12 is stored in the block buffer 13, and an analysis result stored in the block buffer 13 is corrected by the command speed correcting unit 14. However, the command speed correcting unit 14 may be arranged at a subsequent stage of the pre-interpolation acceleration/deceleration processing unit 15, inside the interpolation processing unit 17, or at a subsequent stage of the interpolation processing unit 17 in consideration of speed override. In addition, similarly, the acceleration correcting unit 16 may be arranged at the subsequent stage of the pre-interpolation acceleration/deceleration processing unit 15, inside the interpolation processing unit 17, or at the subsequent stage of the interpolation processing unit 17.

In the present disclosure, the pre-interpolation acceleration/deceleration A is a constant and is linearly accelerated (or decelerated) at a constant speed, but the pre-interpolation acceleration/deceleration A is not necessarily a constant. The technique of the present disclosure can also be applied to an exponential acceleration part (or deceleration part) or a bell-shaped acceleration part (or deceleration part).

In a case where a corner part is generated in the current block and the next block, the numerical controller 100 of the present disclosure can generate a command to pass through the corner part, and thus can control the machine tool with the same command as the machining program. In actual machining, an error occurs due to inertia or overshooting, but by generating a command to always passes through the corner part, machining with uniform quality having the same error can be performed. In addition, in the conventional block overlap processing, there is a problem that data that can be acquired at the time of machine adjustment is not stable because commands vary. Since the numerical controller of the present disclosure outputs commands of the same path, data used for machine adjustment is stabilized.

REFERENCE SIGNS LIST

100 Numerical controller
11 Machining program storing unit
12 Machining program analyzing unit
13 Block buffer
14 Command speed correcting unit
15 Pre-interpolation acceleration/deceleration processing unit
16 Acceleration correcting unit
17 Interpolation processing unit
111 CPU
112 ROM
113 RAM
114 Non-volatile memory

The invention claimed is:

1. A numerical controller that controls a relative speed between a tool and a workpiece on a basis of a machining program, the numerical controller comprising:
 a processor configured to:
 analyze a first block and a second block that are included in the machining program, the first block being a movement command, the second block being a next movement command;

in a case where a corner part exists between the first block and the second block, calculate an allowable speed at the corner part at the time of passing through the corner part;

calculate a block command movement amount that is a distance between a start point and an end point of the first block;

calculate a movement amount in each of an acceleration part where a pre-interpolation speed at the start point of the first block is accelerated to a command speed of the machining program, a constant-speed part where the command speed of the machining program is maintained, and a deceleration part where deceleration is performed from the command speed of the machining program to the allowable speed at the corner part adjacent to the second block on a basis of the pre-interpolation speed at the start point of the first block, the allowable speed at the corner part, and the block command movement amount of the first block;

obtain a remaining movement amount of the first block from the movement amount of each of the acceleration part, the constant-speed part, and the deceleration part, and the block command movement amount;

correct the command-speed of the constant speed, wherein in a case where a correction amount of the command speed exceeds a preset threshold value, the processor adjusts the correction amount of the command speed by increasing a number of times of interpolation processing; and correct a pre-interpolation acceleration of the acceleration part, wherein in a case where a correction amount of the pre-interpolation acceleration of the acceleration part exceeds a preset threshold value, the processor adjusts the pre-interpolation acceleration by increasing or decreasing a number of times of interpolation processing in the acceleration part, wherein the processor is configured to correct at least one of the pre-interpolation acceleration of the acceleration part, the command speed of the constant-speed part, and a pre-interpolation acceleration of the deceleration part to adjust the movement amount of the acceleration part, the movement amount of the constant-speed part, and the movement amount of the deceleration part to be extended by a same amount as the remaining movement amount, and to make a sum of the movement amount of the acceleration part, the movement amount of the constant-speed part, and the movement amount of the deceleration part is equal to the calculated block command movement amount, and wherein the processor controls a movement of the tool in accordance with the adjusted movement amount of the acceleration part, the constant speed part or the decelerated part of the block command movement amount to cause the tool to pass through the corner part while maintaining the allowable speed at the corner part.

2. A numerical controller that controls a relative speed between a tool and a workpiece on a basis of a machining program, the numerical controller comprising:

a processor configured to:

analyze a first block and a second block that are included in the machining program, the first block being a movement command, the second block being a next movement command;

in a case where a corner part exists between the first block and the second block, calculate an allowable speed at the corner part at the time of passing through the corner part;

calculate a block command movement amount that is a distance between a start point and an end point of the first block;

calculate a movement amount in each of an acceleration part where a pre-interpolation speed at the start point of the first block is accelerated to a command speed of the machining program, a constant-speed part where the command speed of the machining program is maintained, and a deceleration part where deceleration is performed from the command speed of the machining program to the allowable speed at the corner part adjacent to the second block on a basis of the pre-interpolation speed at the start point of the first block, the allowable speed at the corner part, and the block command movement amount of the first block;

obtain a remaining movement amount of the first block from the movement amount of each of the acceleration part, the constant-speed part, and the deceleration part, and the block command movement amount;

correct the command-speed of the constant speed, wherein in a case where a correction amount of the command speed exceeds a preset threshold value, the processor adjusts the correction amount of the command speed of the constant-speed part by increasing a number of times of interpolation processing; and correct a pre-interpolation acceleration of the deceleration part, wherein in a case where a correction amount of the pre-interpolation acceleration of the deceleration part exceeds a preset threshold value, the processor adjusts the pre-interpolation acceleration by increasing or decreasing a number of times of interpolation processing, wherein the processor is configured to correct at least one of a pre-interpolation acceleration of the acceleration part, the command speed of the constant-speed part, and the pre-interpolation acceleration of the deceleration part to adjust the movement amount of the acceleration part, the movement amount of the constant-speed part, and the movement amount of the deceleration part to be extended by a same amount as the remaining movement amount, and to make a sum of the movement amount of the acceleration part, the movement amount of the constant-speed part, and the movement amount of the deceleration part equal to the calculated block command movement amount, and wherein the processor controls a movement of the tool in accordance with the adjusted movement amount of the acceleration part, the constant speed part or the decelerated part of the block command movement amount to cause the tool to pass through the corner part while maintaining the allowable speed at the corner part.

3. A non-transitory computer-readable storage medium storing a computer-readable command that, when executed by one or more processors, causes the one or more processors to perform operations comprising:

analyzing a first block and a second block that are included in a machining program, the first block being a movement command, the second block being a next movement command;

in a case where a corner part exists between the first block and the second block, calculating an allowable speed at the corner part at the time of passing through the corner part;

calculating a block command movement amount that is a distance between a start point and an end point of the first block;

calculating a movement amount in each of an acceleration part where a pre-interpolation speed at the start point of the first block is accelerated to a command speed of the machining program, a constant-speed part where the command speed of the machining program is maintained, and a deceleration part where deceleration is performed from the command speed of the machining program to the allowable speed at the corner part adjacent to the second block on the basis of the pre-interpolation speed at the start point of the first block, the allowable speed at the corner part, and the block command movement amount of the first block;

obtaining a remaining movement amount of the first block from the movement amount of each of the acceleration part, the constant-speed part, and the deceleration part and the block command movement amount;

correcting at least one of a pre-interpolation acceleration of the acceleration part, the command speed of the constant-speed part, and a pre-interpolation acceleration of the deceleration part to adjust the movement amount of the acceleration part, the movement amount of the constant-speed part, and the movement amount of the deceleration part to be extended by a same amount as the remaining movement amount, and bring a sum of the movement amount of the acceleration part, the movement amount of the constant-speed part, and the movement amount of the deceleration part equal to the calculated block command movement amount, wherein in a case where a correction amount of the command speed of the constant speed part exceeds a threshold value, the correction amount of the command speed of the constant speed part is adjusted by increasing a number of times of a pulse interpolation processing in the constant speed part, wherein in a case where a correction amount of the pre-interpolation acceleration exceeds a threshold value, the pre-interpolation acceleration is corrected by increasing or decreasing a number of times of interpolation processing in the acceleration part; and controlling a movement of the tool in accordance with the adjusted movement amount of the acceleration part, the constant speed part or the decelerated part of the block command movement amount to cause the tool to pass through the corner part while maintaining the allowable speed at the corner part.

4. A non-transitory computer-readable storage medium storing a computer-readable command that, when executed by one or more processors, causes the one or more processors to perform operations comprising:

analyzing a first block and a second block that are included in a machining program, the first block being a movement command, the second block being a next movement command;

in a case where a corner part exists between the first block and the second block, calculating an allowable speed at the corner part at the time of passing through the corner part;

calculating a block command movement amount that is a distance between a start point and an end point of the first block;

calculating a movement amount in each of an acceleration part where a pre-interpolation speed at the start point of the first block is accelerated to a command speed of the machining program, a constant-speed part where the command speed of the machining program is maintained, and a deceleration part where deceleration is performed from the command speed of the machining program to the allowable speed at the corner part adjacent to the second block on the basis of the pre-interpolation speed at the start point of the first block, the allowable speed at the corner part, and the block command movement amount of the first block;

obtaining a remaining movement amount of the first block from the movement amount of each of the acceleration part, the constant-speed part, and the deceleration part and the block command movement amount;

correcting at least one of a pre-interpolation acceleration of the acceleration part, the command speed of the constant-speed part, and a pre-interpolation acceleration of the deceleration part to adjust the movement amount of the acceleration part, the movement amount of the constant-speed part, and the movement amount of the deceleration part to be extended by a same amount as the remaining movement amount, and bring a sum of the movement amount of the acceleration part, the movement amount of the constant-speed part, and the movement amount of the deceleration part equal to the calculated block command movement amount, wherein in a case where a correction amount of the command speed of the constant-speed part exceeds a threshold value, the correction amount of the command speed of the constant-speed part is adjusted by increasing a number of times of a pulse interpolation processing in the constant-speed part, wherein in a case where a correction amount of the pre-interpolation acceleration of the deceleration part exceeds a threshold value, the pre-interpolation acceleration is corrected by increasing or decreasing a number of times of an interpolation processing in the deceleration part; and controlling a movement of the tool in accordance with the adjusted movement amount of the acceleration part, the constant speed part or the decelerated part of the block command movement amount to cause the tool to pass through the corner part while maintaining the allowable speed at the corner part.

* * * * *